(12) United States Patent
Presna

(10) Patent No.: US 10,780,790 B1
(45) Date of Patent: Sep. 22, 2020

(54) ELECTRICAL CHARGING SYSTEM FOR A VEHICLE

(71) Applicant: Pierre-Richard Presna, Bridgeport, CT (US)

(72) Inventor: Pierre-Richard Presna, Bridgeport, CT (US)

( * ) Notice: Subject to any disclaimer, the term of this patent is extended or adjusted under 35 U.S.C. 154(b) by 220 days.

(21) Appl. No.: 16/106,378

(22) Filed: Aug. 21, 2018

(51) Int. Cl.
| | | |
|---|---|---|
| *B60L 53/24* | (2019.01) | |
| *H02J 7/14* | (2006.01) | |
| *B60L 50/60* | (2019.01) | |
| *H02P 5/00* | (2016.01) | |

(52) U.S. Cl.
CPC ............ *B60L 53/24* (2019.02); *B60L 50/66* (2019.02); *H02J 7/1423* (2013.01); *H02P 5/00* (2013.01)

(58) Field of Classification Search
CPC .............. H02J 7/00; B60L 53/00; B60L 50/00
See application file for complete search history.

(56) References Cited

U.S. PATENT DOCUMENTS

| | | | | |
|---|---|---|---|---|
| 4,211,930 A | * | 7/1980 | Fengler | B60L 50/13 290/15 |
| 5,710,699 A | * | 1/1998 | King | H02P 23/06 363/132 |
| 5,994,789 A | * | 11/1999 | Ochiai | B60L 50/51 307/10.1 |
| 6,518,732 B2 | | 2/2003 | Palanisamy | |
| D483,695 S | | 12/2003 | Bellington | |
| 6,886,647 B1 | * | 5/2005 | Gotta | B60K 1/02 180/65.1 |
| 7,071,642 B2 | * | 7/2006 | Wilton | B60L 58/26 318/268 |
| 7,122,979 B2 | * | 10/2006 | Wilton | B60L 3/102 318/400.09 |
| 7,400,113 B2 | * | 7/2008 | Osborne | H02J 7/0018 320/118 |
| 7,830,117 B2 | * | 11/2010 | Ambrosio | B60L 3/12 320/109 |
| 8,453,770 B2 | * | 6/2013 | Tang | B60L 15/20 180/65.1 |
| 8,816,613 B2 | * | 8/2014 | Lee | B60L 15/2009 318/140 |
| 8,825,250 B2 | * | 9/2014 | Luke | B60L 3/003 701/22 |
| 9,067,500 B2 | * | 6/2015 | Penev | H02S 10/12 |
| 9,205,841 B2 | * | 12/2015 | Williams | B60L 3/12 |
| 9,855,856 B2 | * | 1/2018 | Patana | B60L 15/2045 |

(Continued)

*Primary Examiner* — Rexford N Barnie
*Assistant Examiner* — Joseph N Inge

(57) ABSTRACT

The electric charging system for a vehicle is configured for use with an electric vehicle. The electric vehicle further comprises one or more electric drive motors. The electric charging system for a vehicle provides electrical energy to the one or more electric drive motors. The electric charging system for a vehicle comprises a plurality of battery banks, a regenerative circuit, and a control circuit. Each of the plurality of battery banks is a chemical device that converts chemical potential energy into electrical energy used to power the one or more electric drive motors of the electric vehicle. The regenerative circuit is a circuit that converts the motion of the electric vehicle into electricity used to recharge the plurality of battery banks. The control circuit regulates and controls the operation of the electric charging system for a vehicle.

18 Claims, 12 Drawing Sheets

(56) References Cited

U.S. PATENT DOCUMENTS

| | | | | |
|---|---|---|---|---|
| 2001/0015299 A1* | 8/2001 | Moore | ............... | B60K 6/48 |
| | | | | 180/243 |
| 2004/0207350 A1* | 10/2004 | Wilton | ............... | B60L 3/0061 |
| | | | | 318/376 |
| 2010/0006351 A1* | 1/2010 | Howard | ............... | B60L 8/006 |
| | | | | 180/2.2 |
| 2010/0181126 A1* | 7/2010 | Penrod | ............... | B60W 10/06 |
| | | | | 180/65.285 |
| 2012/0255798 A1* | 10/2012 | Palmer | ............... | B60K 17/04 |
| | | | | 180/65.6 |
| 2016/0137078 A1* | 5/2016 | Yun | ............... | B60L 11/1812 |
| | | | | 307/10.1 |
| 2016/0181837 A1* | 6/2016 | Shu | ............... | H02J 7/0018 |
| | | | | 320/119 |

\* cited by examiner

ELECTRICAL CHARGING SYSTEM FOR A VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles in general including electrically powered vehicles, more specifically, an electric propulsion system with power supplied within the vehicle. (B60L11/04)

SUMMARY OF INVENTION

The electric charging system for a vehicle is an electric circuit. The electric charging system for a vehicle is configured for use with an electric vehicle. The electric vehicle further comprises a plurality of wheels, one or more electric drive motors, and a load sensor. The electric charging system for a vehicle provides electrical energy to the one or more electric drive motors such that the one or more electric drive motors propel the electric vehicle. The electric charging system for a vehicle comprises a plurality of battery banks, a regenerative circuit, and a control circuit. The plurality of battery banks, the regenerative circuit, and the control circuit are electrically interconnected. Each of the plurality of battery banks is a chemical device that converts chemical potential energy into electrical energy used to power the one or more electric drive motors of the electric vehicle. The regenerative circuit is a circuit that converts the motion of the electric vehicle into electricity used to recharge the plurality of battery banks. The control circuit regulates and controls the operation of the electric charging system for a vehicle.

These together with additional objects, features and advantages of the electric charging system for a vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the electric charging system for a vehicle in detail, it is to be understood that the electric charging system for a vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the electric charging system for a vehicle.

It is therefore important that the claims be regarded as including such equivalent construction insofar as they do not depart from the spirit and scope of the electric charging system for a vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
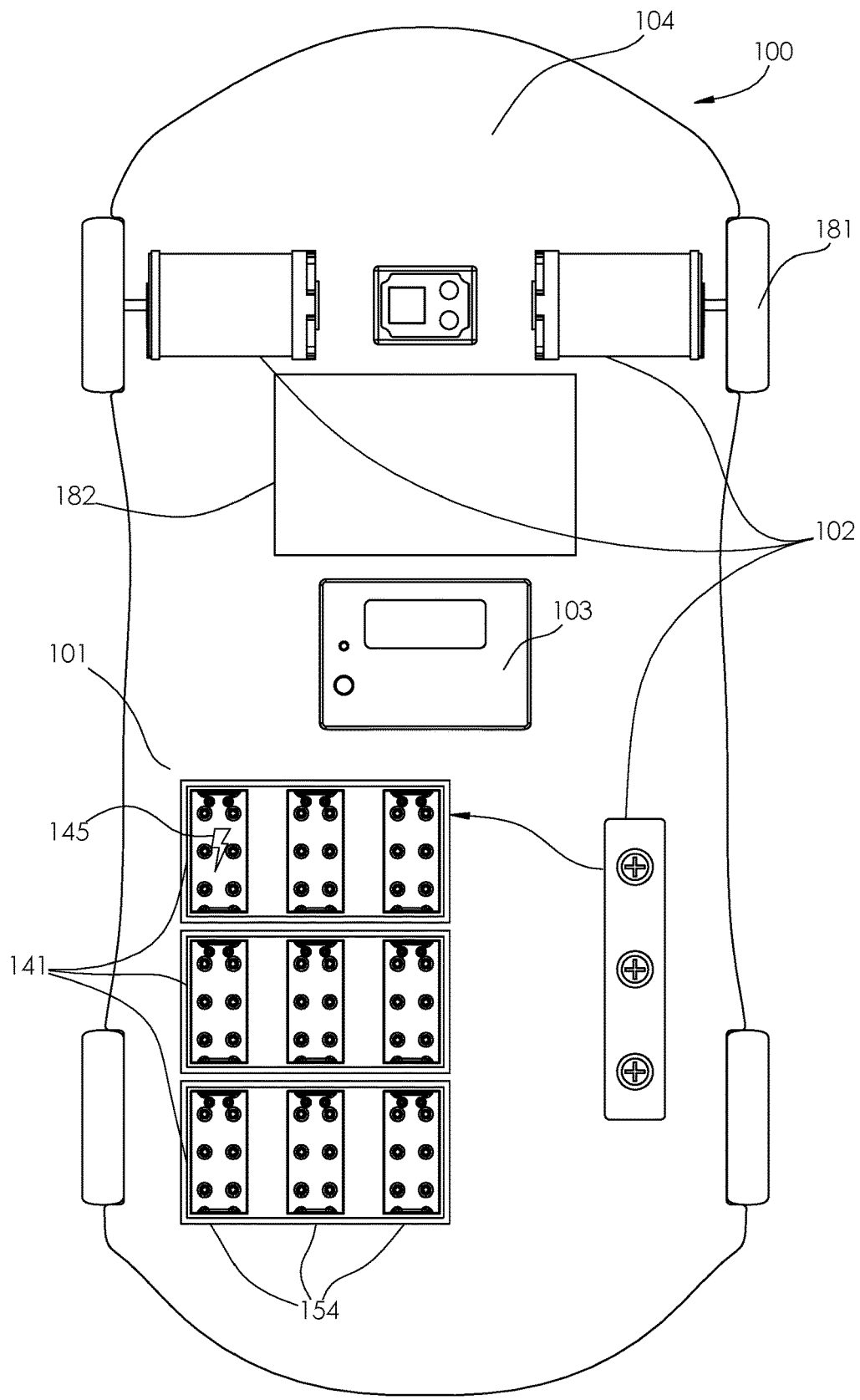
FIG. 1 is a charge flow layout diagram of an embodiment of the disclosure.
Figure 2:
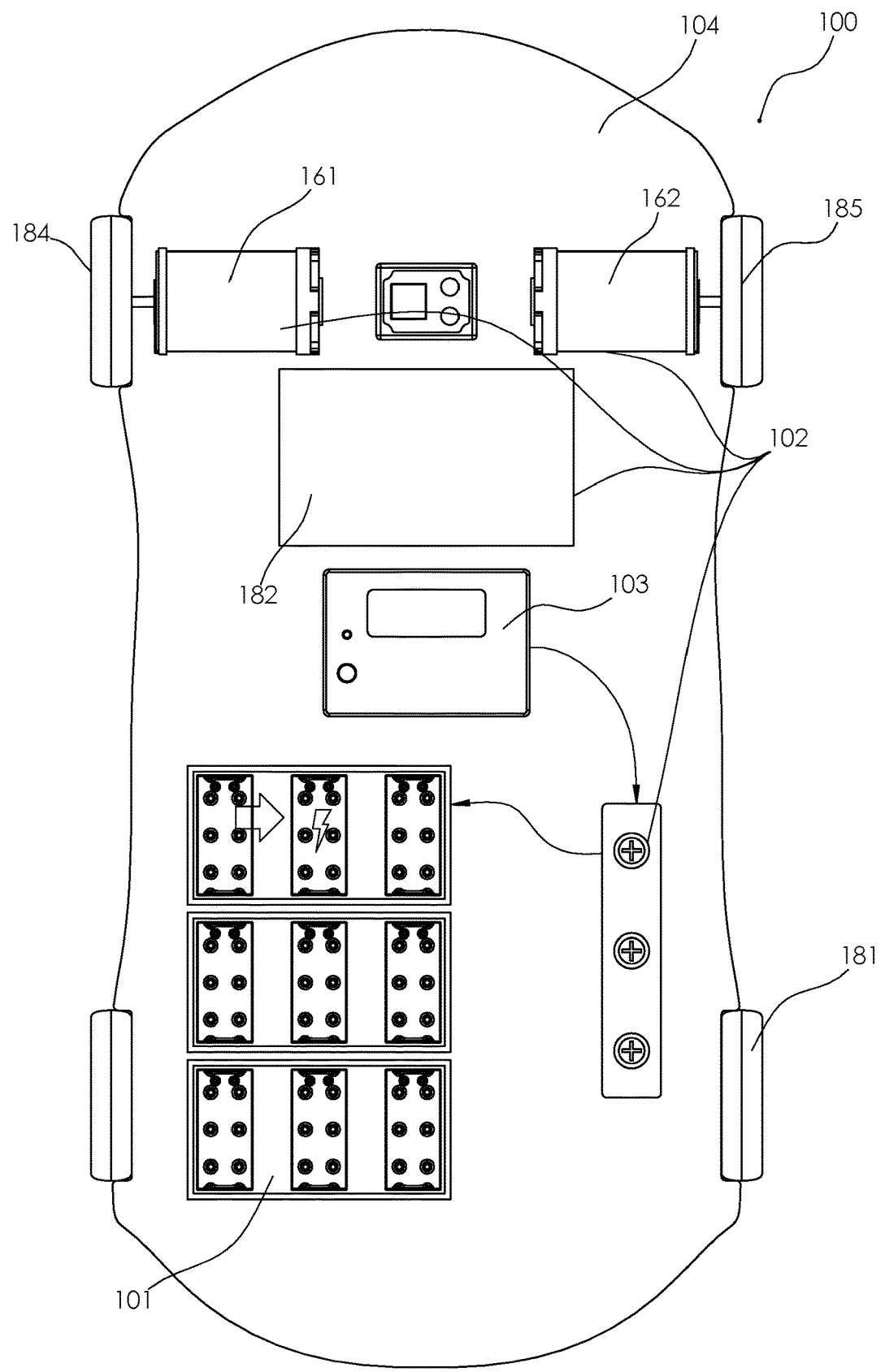
FIG. 2 is a charge flow layout diagram of an embodiment of the disclosure.
Figure 3:
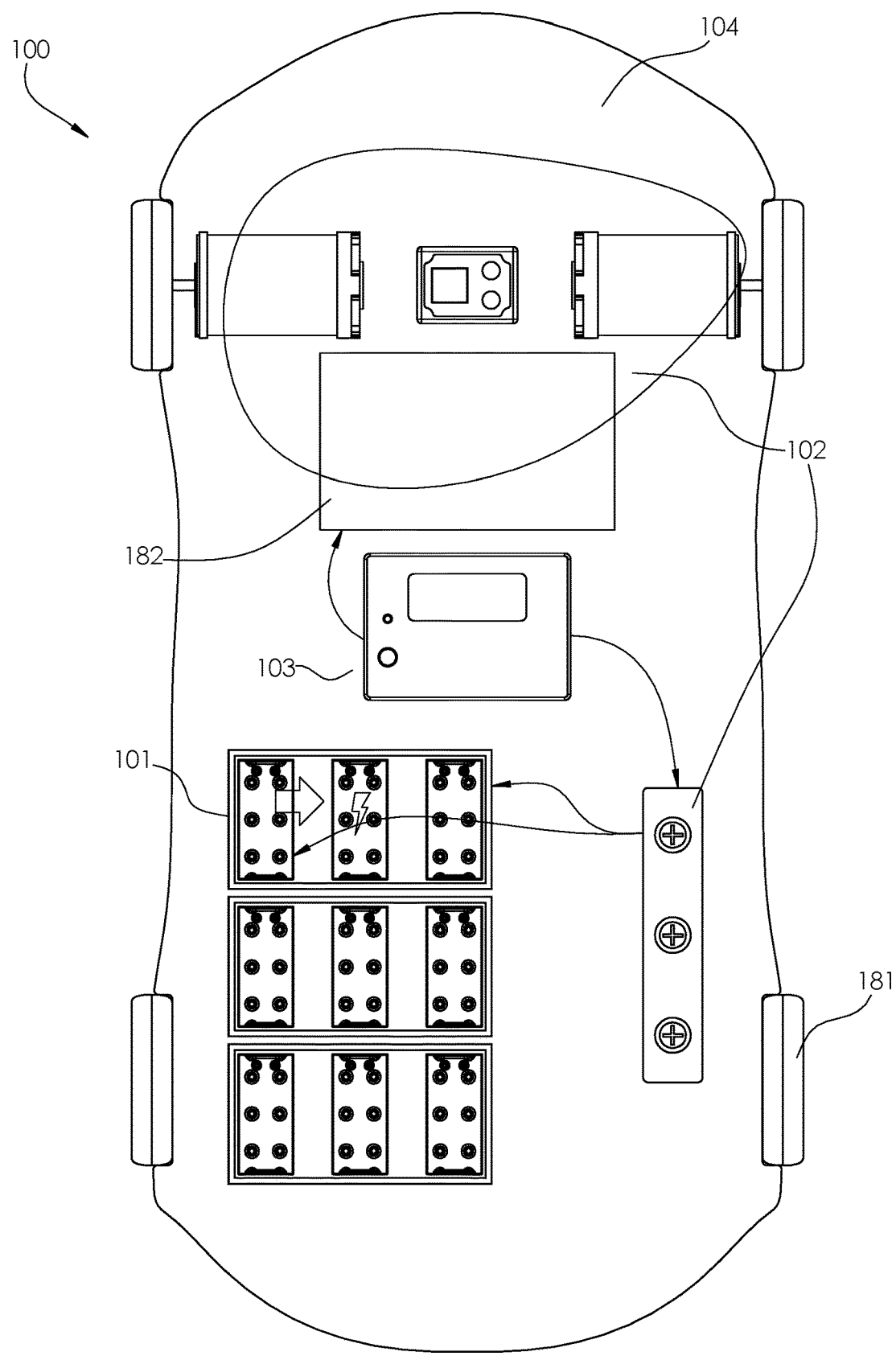
FIG. 3 is a charge flow layout diagram of an embodiment of the disclosure.
Figure 4:
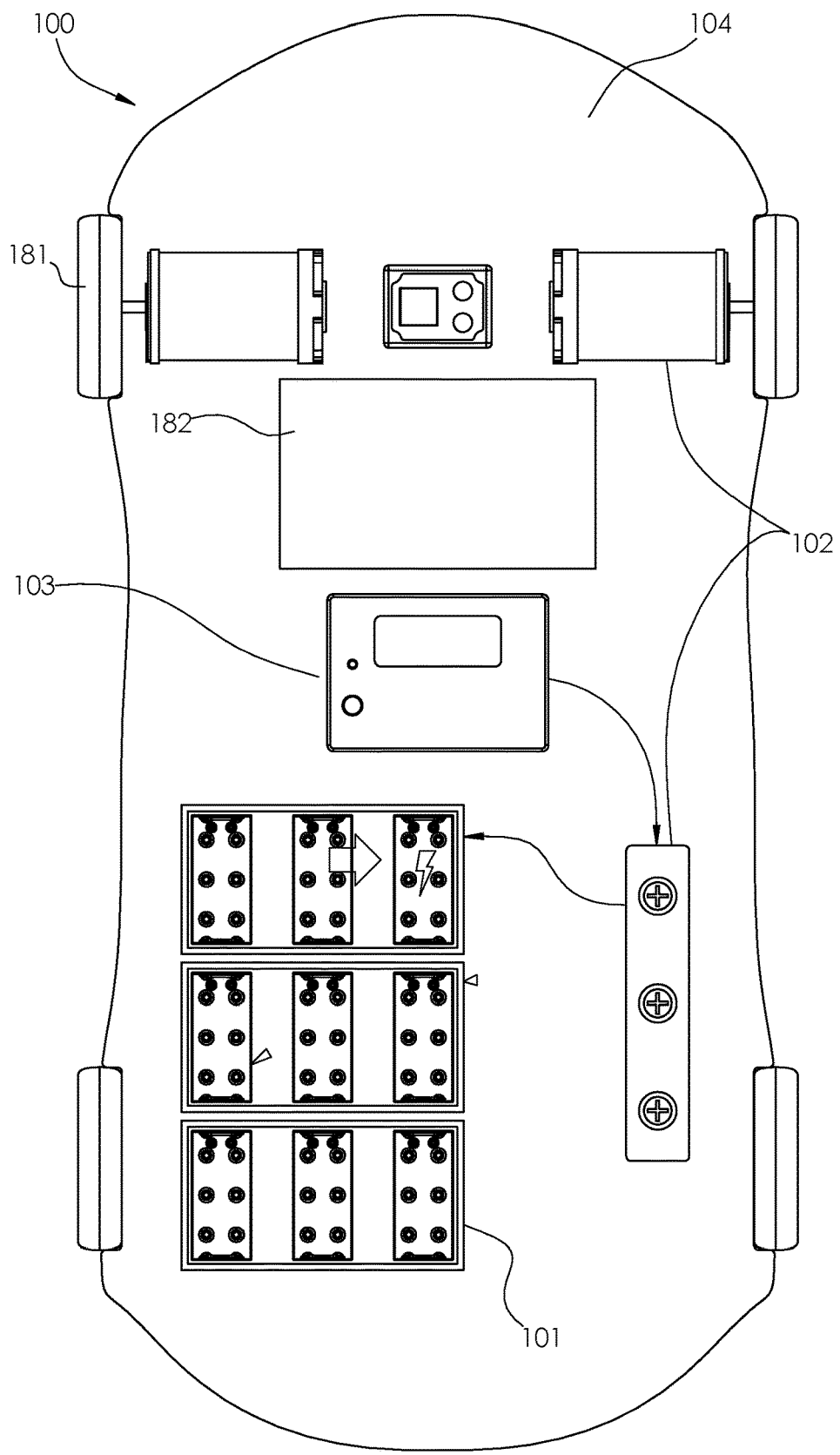
FIG. 4 is a charge flow layout diagram of an embodiment of the disclosure.
Figure 5:
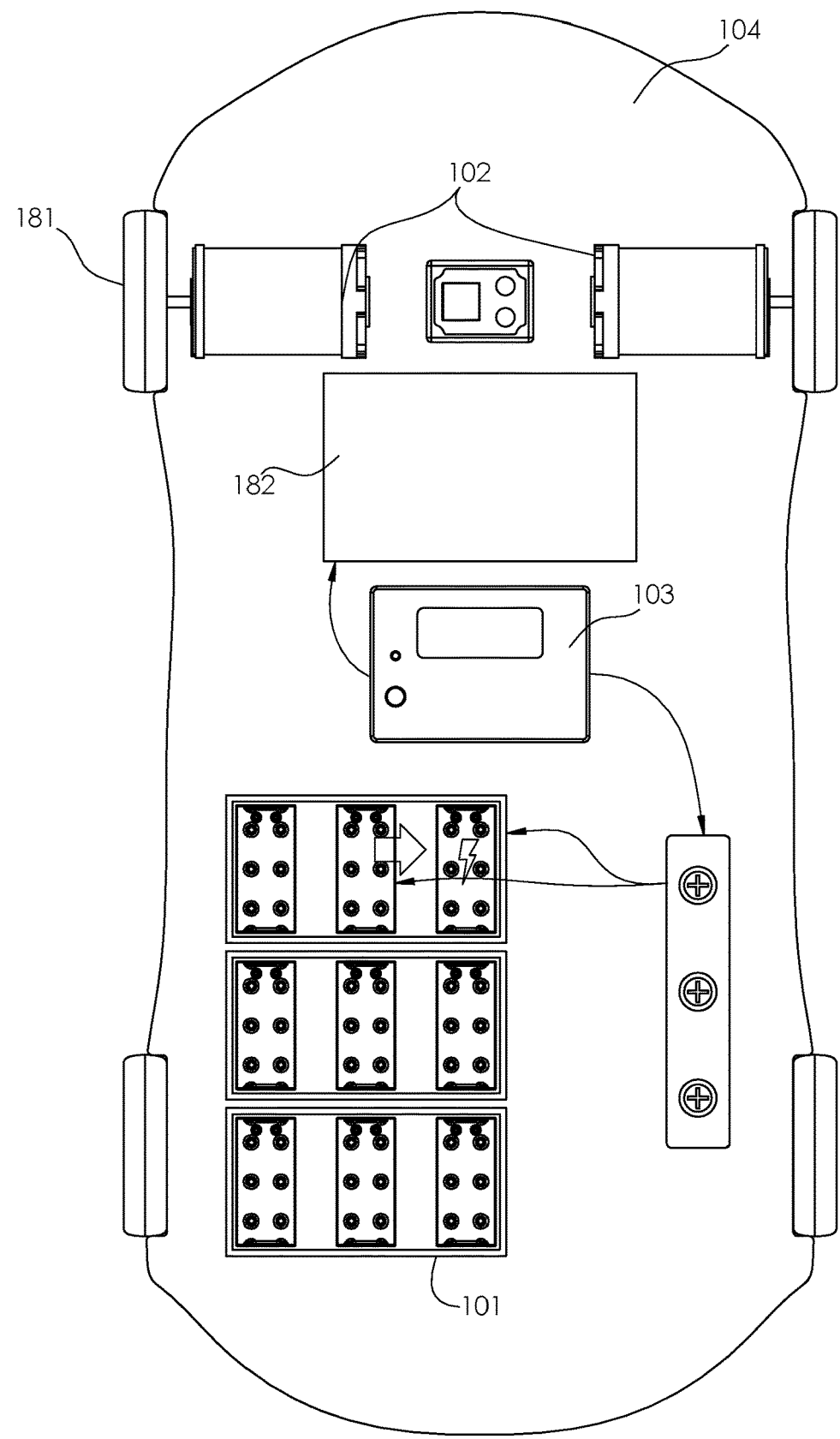
FIG. 5 is a charge flow layout diagram of an embodiment of the disclosure.
Figure 6:
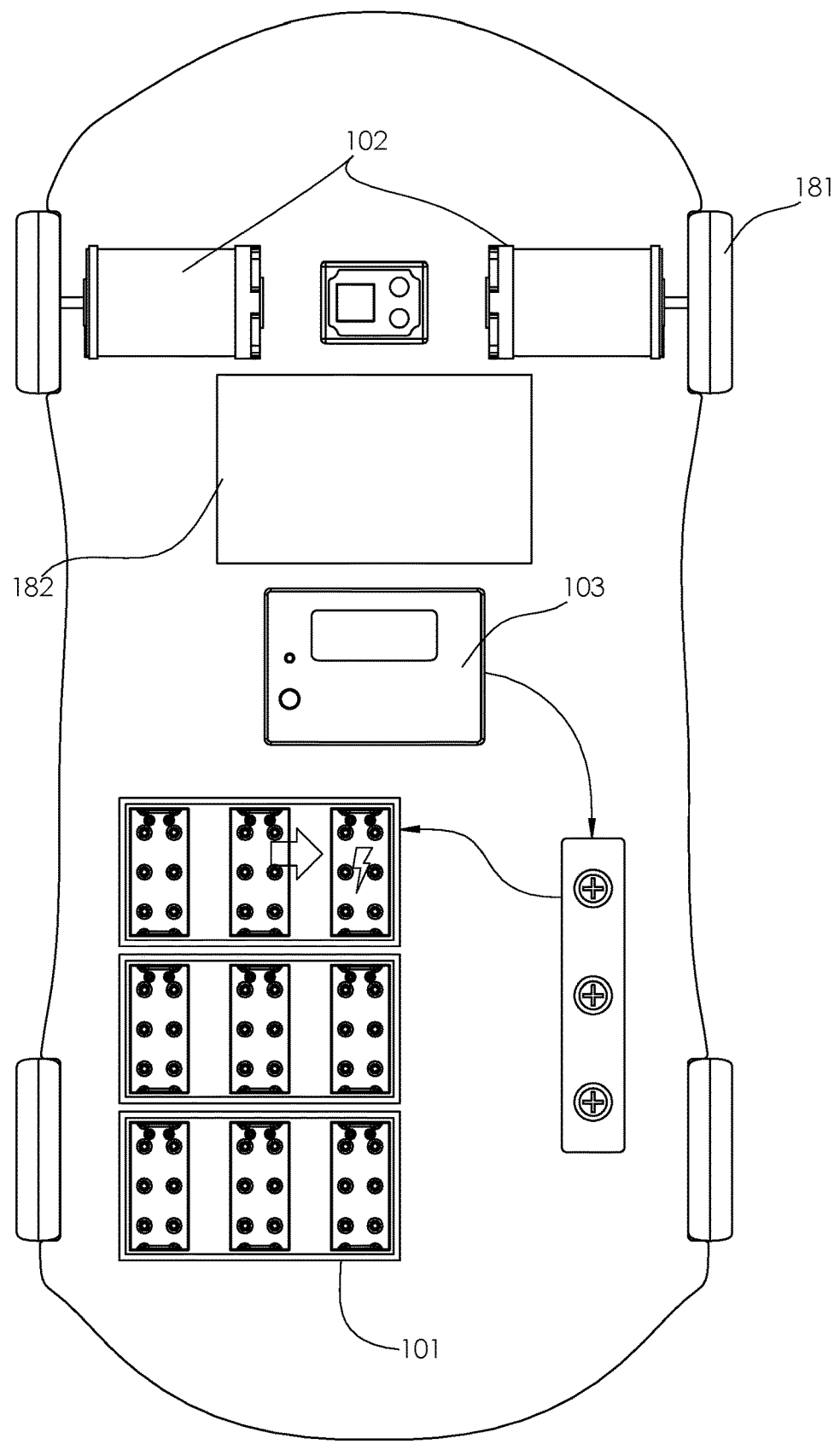
FIG. 6 is a charge flow layout diagram of an embodiment of the disclosure.
Figure 7:
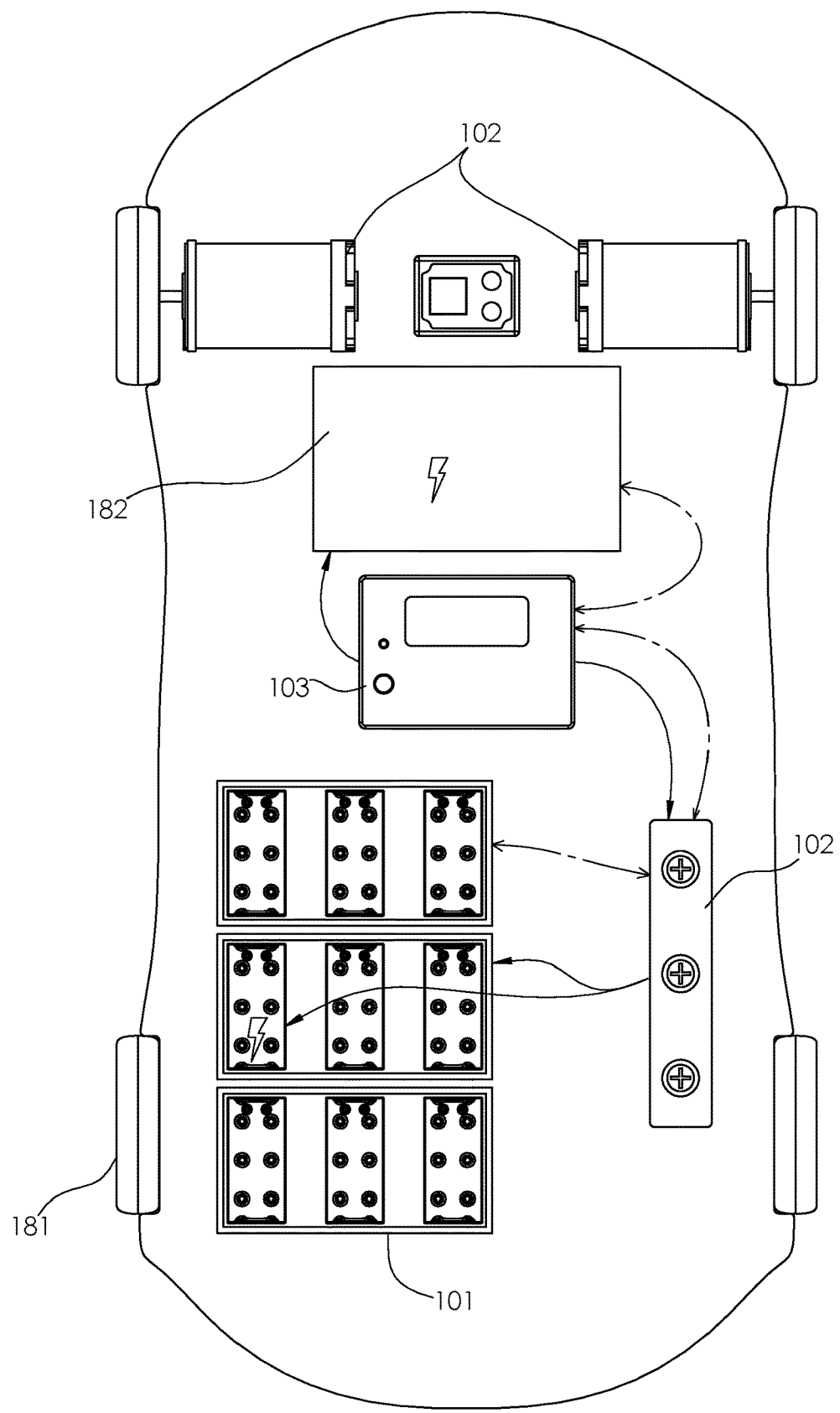
FIG. 7 is a charge flow layout diagram of an embodiment of the disclosure.
Figure 8:
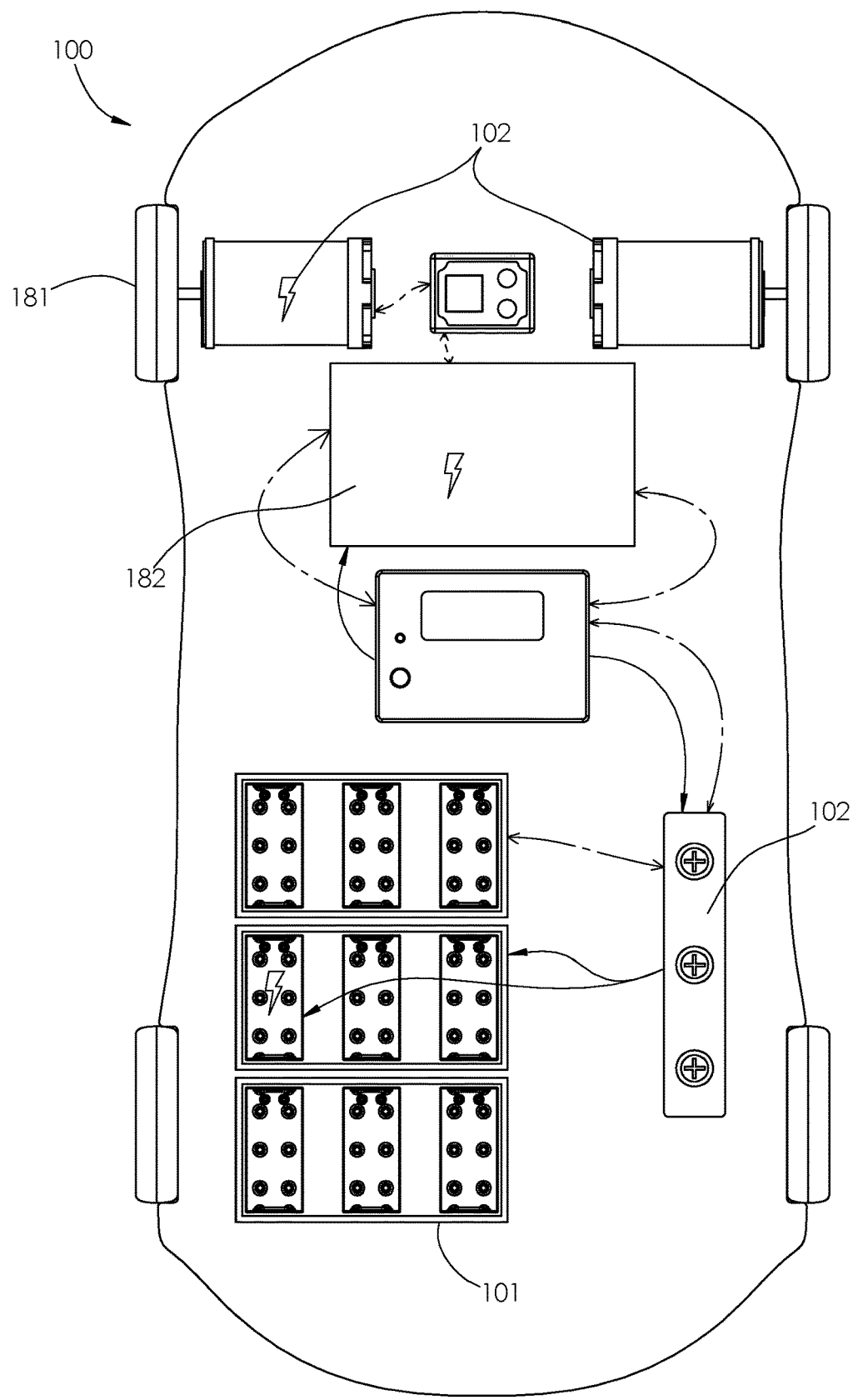
FIG. 8 is a charge flow layout diagram of an embodiment of the disclosure.
Figure 9:
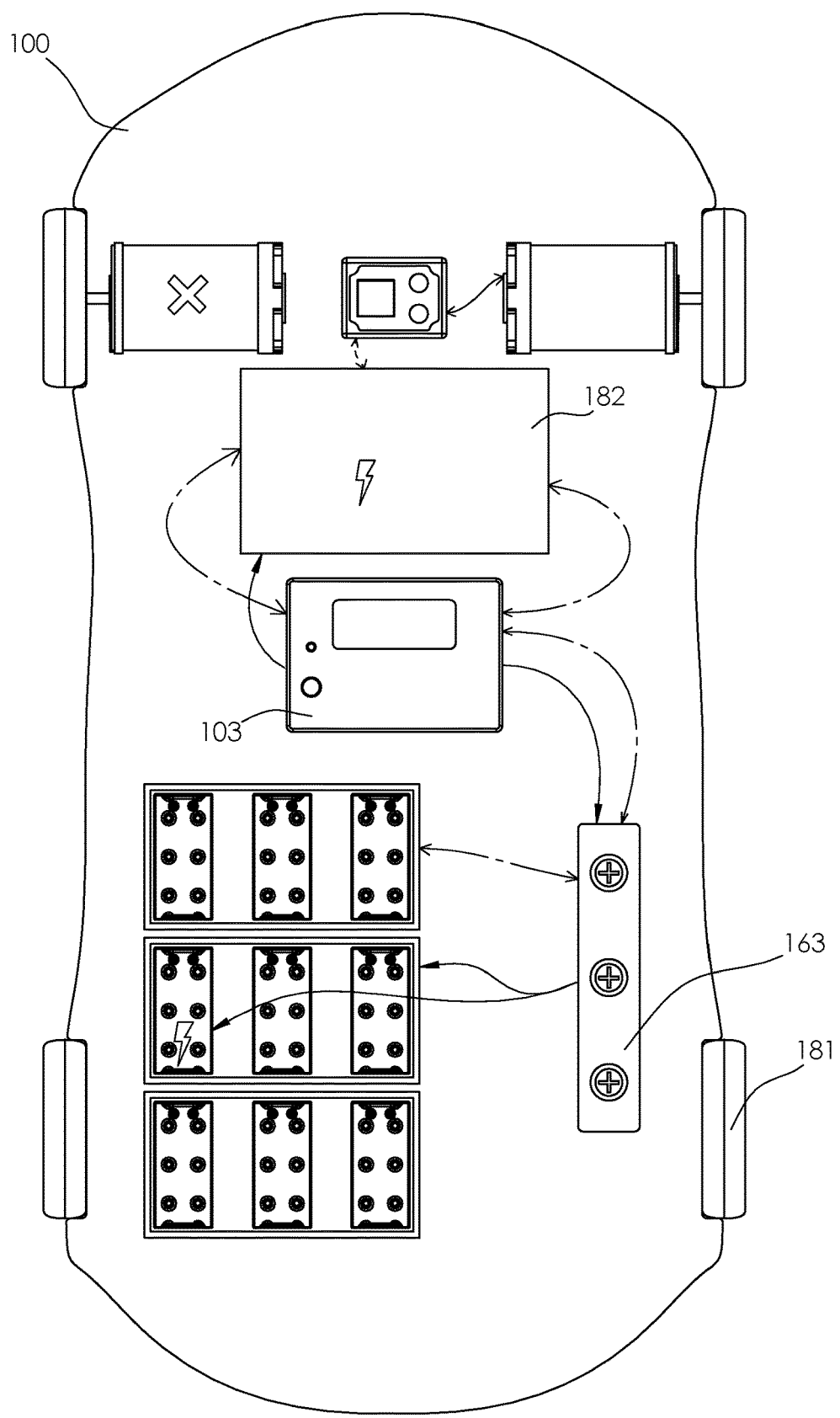
FIG. 9 is a charge flow layout diagram of an embodiment of the disclosure.
Figure 10:
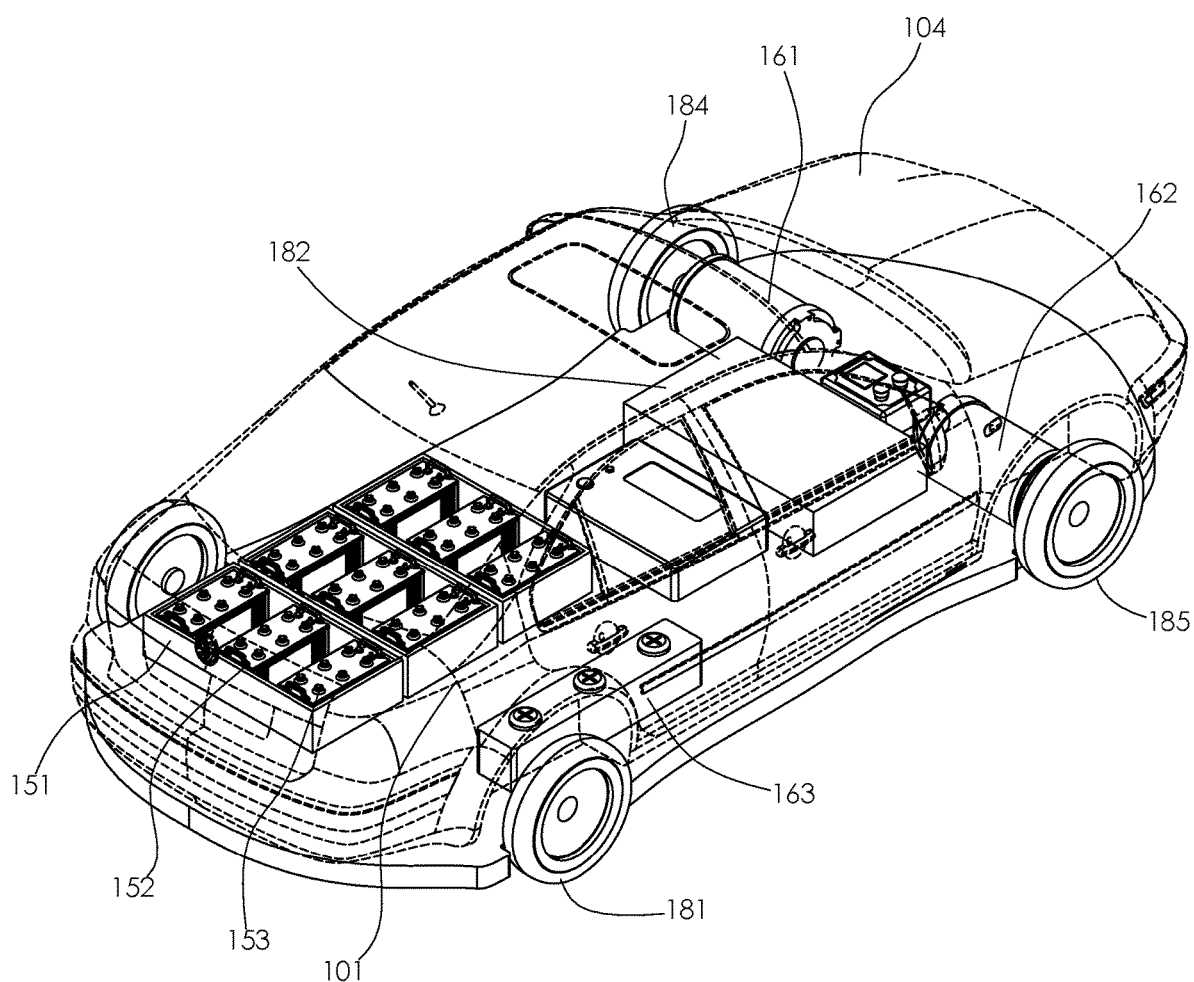
FIG. 10 is a charge flow layout diagram of an embodiment of the disclosure.
Figure 11:
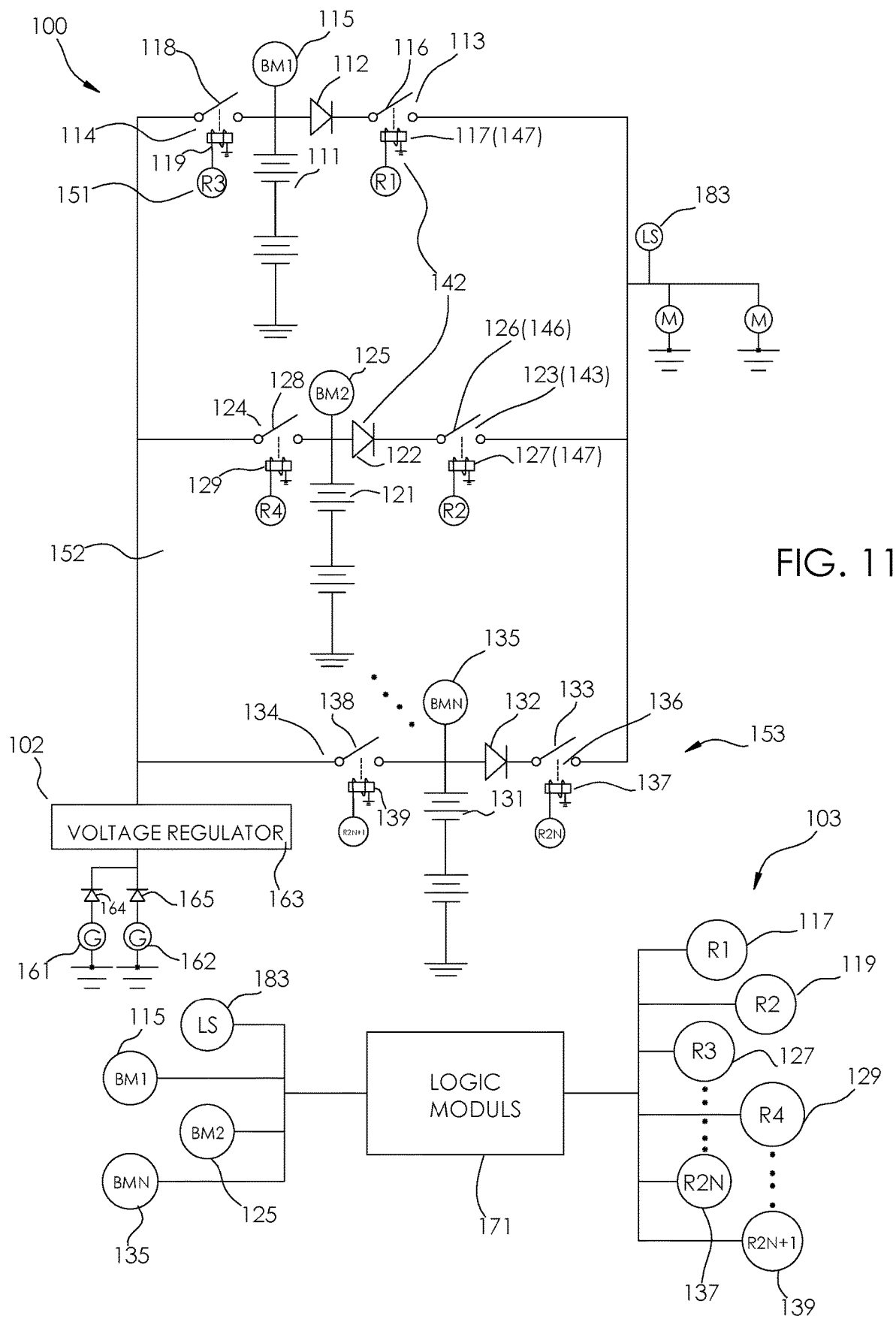
FIG. 11 is a block diagram of an embodiment of the disclosure.
Figure 12:
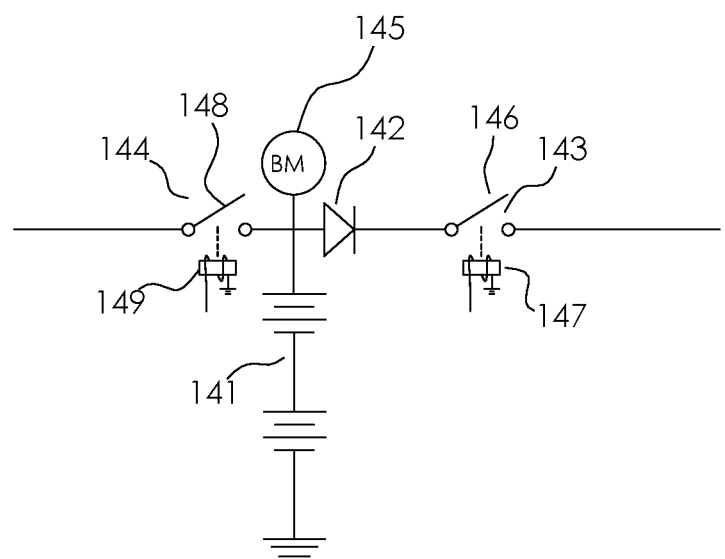
FIG. 12 is a detail of an embodiment of the disclosure.

Detailed reference will now be made to one or more potential embodiments of the disclosure, which are illustrated in FIGS. 1 through 12.

The electric charging system for a vehicle 100 (hereinafter invention) is an electric circuit. The invention 100 is configured for use with an electric vehicle 104. The invention 100 provides electrical energy to the one or more electric drive motors 182 such that the one or more electric drive motors 182 propel the electric vehicle 104. The electric vehicle 104 is defined elsewhere in this disclosure. The electric vehicle 104 further comprises a plurality of wheels 181, one or more electric drive motors 182, and a load sensor 183. The plurality of wheels 181 further comprises a first selected wheel 184 and a second selected wheel 185.

Each of the one or more electric drive motors 182 is a commercially available electric motor used to propel the electric vehicle 104. The load sensor 183 is an electrical sensor that monitors the flow of electrical energy into the one or more electric drive motors 182. The control system 103 monitors the load sensor 183 for an indication that the one or more electric drive motors 182 require more power.

The invention 100 comprises a plurality of battery banks 101, a regenerative circuit 102, and a control circuit 103. The plurality of battery banks 101, the regenerative circuit 102, and the control circuit 103 are electrically interconnected. Each of the plurality of battery banks 101 is a chemical device that converts chemical potential energy into electrical energy used to power the one or more electric drive motors 182 of the electric vehicle 104. The regenerative circuit 102 is a circuit that converts the motion of the electric vehicle 104 into electricity used to recharge the plurality of battery banks 101. The control circuit 103 regulates and controls the operation of the invention 100.

Each of the plurality of battery banks 101 is an electrical circuit that converts chemical potential energy into electrical energy. Each of the plurality of battery banks 101 provides electrical energy used to power the one or more electric drive motors 182 of the electric vehicle 104. Any first battery bank 151 selected from the plurality of battery banks 101 is configured to provide electrical energy to the one or more electric drive motors 182 independently or in conjunction with a second battery bank 151 selected from the plurality of battery banks 101. As shown most clearly in FIG. 11, the plurality of battery banks 101 electrically connect in a parallel circuit.

The plurality of battery banks 101 comprises a collection of individual battery banks 154. Each individual battery bank 154 comprises a battery 141, a diode 142, a discharge relay 143, a charging relay 144, and a battery bank sensor 145.

The battery 141 is a chemical device. The battery 141 converts energy stored as chemical potential energy into electrical energy used to power the one or more electric drive motors 182 of the electric vehicle 104. The battery 141 is formed from a plurality of battery cells that are electrically connected in series to form the battery 141.

The battery 141 is a rechargeable battery 141. The chemical energy stored within the rechargeable battery 141 is renewed and restored through the voltage regulator 163. The voltage regulator 163 is an electrical circuit that reverses the polarity of the rechargeable battery 141 and provides the energy necessary to reverse the chemical processes that the rechargeable battery 141 initially used to generate the electrical energy. This reversal of the chemical process creates a chemical potential energy that will later be used by the rechargeable batter 141 to generate electricity. The voltage regulator 163 is a part of the regenerative circuit 102. The voltage regulator 163 receives electrical energy from the first generator 161 and the second generator 162.

The diode 142 is an electrical device that limits the flow of electricity to one direction. The diode 142 prevents the unregulated backflow of electricity from a potential source into the battery 141. The potential source is selected from the group consisting of the one or more electric drive motors 182 and other battery banks selected from the plurality of battery banks 101.

The discharge relay 143 is an electrical switching device. The discharge relay 143 forms a switch that controls the flow of electricity from the battery 141 into the one or more electric drive motors 182 of the electric vehicle 104. The discharge relay 143 further comprises a discharge relay switch 146 and a discharge relay coil 147.

The discharge relay switch 146 is the physical switching element in the discharge relay 143 that completes the electrical circuit between the battery 141 and the one or more electric drive motors 182 of the electric vehicle 104. The discharge relay coil 147 is the coil of the discharge relay 143 that controls the actuation of the discharge relay switch 146. The discharge relay coil 147 is controlled by the control circuit 103. The charging relay 144 is an electrical switching device. The charging relay 144 forms a switch that controls the flow of electricity from the voltage regulator 163 of the regenerative circuit 102 into the battery 141. The charging relay 144 further comprises a charging relay switch 148 and a charging relay coil 149.

The charging relay switch 148 is the physical switching element in the charging relay 144 that completes the electrical circuit between the voltage regulator 163 of the regenerative circuit 102 and the battery 141. The charging relay coil 149 is the coil of the charging relay 144 that controls the actuation of the charging relay switch 148. The charging relay coil 149 is controlled by the control circuit 103.

The battery bank sensor 145 is a commercially available sensor that monitors the battery 141. Specifically, the battery bank sensor 145 measures the amount of chemical potential energy in the battery 141 that is available for conversion into electrical energy. In this disclosure, the chemical potential energy will be presented as a percentage of the maximum chemical potential energy that the battery 141 is capable of storing.

The plurality of battery banks 101 further comprises a first battery bank 151, a second battery bank 152, and a third battery bank 153. The individual battery bank 154 is selected from the group consisting of the first battery bank 151, the second battery bank 152, and the third battery bank 153. Each individual battery bank 154 contained within the plurality of battery banks 101 is identical.

The first battery bank 151 is an electrical circuit that stores a portion of the electrical energy available to power the one or more electric drive motors 182 of the electric vehicle 104. The first battery bank 151 comprises a first battery 111, a first diode 112, a first discharge relay 113, a first charging relay 114, and a first battery bank sensor 115.

The first battery 111 forms the battery 141 of the first battery bank 151.

The first diode 112 forms the diode 142 of the first battery bank 151. The first diode 112 is an electrical device that allows current to flow in only one direction. The first diode 112 installs between the first battery 111 and the first discharge relay switch 116 of the first discharge relay 113 such that electricity will not flow from a parallel battery into the first battery 111. The parallel battery is selected from the group consisting of the second battery 121 of the second battery bank 152 and the third battery 131 of the third battery bank 153.

The first discharge relay 113 forms the discharge relay 143 of the first battery bank 151. The first charging relay 114 forms the charging relay 144 of the first battery bank 151. The first battery bank sensor 115 forms the battery bank sensor 145 of the first battery bank 151. The first discharge relay 113 further comprises a first discharge relay switch 116 and a first discharge relay coil 117. The first charging relay 114 further comprises a first charging relay switch 118 and a first charging relay coil 119.

The first discharge relay switch 116 forms the discharge relay switch 146 of the first discharge relay 113 of the first battery bank 151. The first discharge relay coil 117 forms the discharge relay coil 147 of the first discharge relay 113 of the first battery bank 151. The first charging relay switch 118 forms the charging relay switch 148 of the first charging relay 114 of the first battery bank 151. The first charging relay coil 119 forms the charging relay coil 149 of the first charging relay 114 of the first battery bank 151.

The second battery bank 152 is an electrical circuit that stores a portion of the electrical energy available to power the one or more electric drive motors 182 of the electric vehicle 104. The second battery bank 152 comprises a second battery 121, a second diode 122, a second discharge relay 123, a second charging relay 124, and a second battery bank sensor 125.

The second battery 121 forms the battery 141 of the second battery bank 152.

The second diode 122 forms the diode 142 of the second battery bank 152. The second diode 122 is an electrical device that allows current to flow in only one direction. The second diode 122 installs between the second battery 121 and the second discharge relay switch 126 of the second discharge relay 123 such that electricity will not flow from a parallel battery into the second battery 121. The parallel battery is selected from the group consisting of the first battery 111 of the first battery bank 151 and the third battery 131 of the third battery bank 153.

The second discharge relay 123 forms the discharge relay 143 of the second battery bank 152. The second charging relay 124 forms the charging relay 144 of the second battery bank 152. The second battery bank sensor 125 forms the battery bank sensor 145 of the second battery bank 152. The second discharge relay 123 further comprises a second discharge relay switch 126 and a second discharge relay coil 127. The second charging relay 124 further comprises a second charging relay switch 128 and a second charging relay coil 129.

The second discharge relay switch 126 forms the discharge relay switch 146 of the second discharge relay 123 of the second battery bank 152. The second discharge relay coil 127 forms the discharge relay coil 147 of the second discharge relay 123 of the second battery bank 152. The second charging relay switch 128 forms the charging relay switch 148 of the second charging relay 124 of the second battery bank 152. The second charging relay coil 129 forms the charging relay coil 149 of the second charging relay 124 of the second battery bank 152.

The third battery bank 153 is an electrical circuit that stores a portion of the electrical energy available to power the one or more electric drive motors 182 of the electric vehicle 104. The third battery bank 153 comprises a third battery 131, a third diode 132, a third discharge relay 133, a third charging relay 134, and a third battery bank sensor 135.

The third battery 131 forms the battery 141 of the third battery bank 153.

The third diode 132 forms the diode 142 of the third battery bank 153. The third diode 132 is an electrical device that allows current to flow in only one direction. The third diode 132 installs between the third battery 131 and the third discharge relay switch 136 of the third discharge relay 133 such that electricity will not flow from a parallel battery into the third battery 131. The parallel battery is selected from the group consisting of the first battery 111 of the first battery bank 151 and the second battery 121 of the second battery bank 152.

The third discharge relay 133 forms the discharge relay 143 of the third battery bank 153. The third charging relay 134 forms the charging relay 144 of the third battery bank 153. The third battery bank sensor 135 forms the battery bank sensor 145 of the third battery bank 153. The third discharge relay 133 further comprises a third discharge relay switch 136 and a third discharge relay coil 137. The third charging relay 134 further comprises a third charging relay switch 138 and a third charging relay coil 139.

The third discharge relay switch 136 forms the discharge relay switch 146 of the third discharge relay 133 of the third battery bank 153. The third discharge relay coil 137 forms the discharge relay coil 147 of the third discharge relay 133 of the third battery bank 153. The third charging relay switch 138 forms the charging relay switch 148 of the third charging relay 134 of the third battery bank 153. The third charging relay coil 139 forms the charging relay coil 149 of the third charging relay 134 of the third battery bank 153.

The regenerative circuit 102 is an electrical circuit that converts the momentum of the electric vehicle 104 into electrical energy used to recharge the plurality of battery banks 101. The regenerative circuit 102 comprises a first generator 161, a second generator 162, a voltage regulator 163, a fourth diode 164, and a fifth diode 165.

The first generator 161 is a commercially available electrical generator. The first generator 161 mounts on the electric vehicle 104 such that the rotation of a first selected wheel 184 selected from the plurality of wheels 181 will rotate the first generator 161. The rotation of the first generator 161 by the first selected wheel 184 generates electricity that is subsequently regulated by the voltage regulator 163 and returned to a battery bank selected from the plurality of battery banks 101 in a manner that recharges the selected battery bank.

The second generator 162 is a commercially available electrical generator. The second generator 162 mounts on the electric vehicle 104 such that the rotation of a second selected wheel 185 selected from the plurality of wheels 181 will rotate the second generator 162. The rotation of the second generator 162 by the second selected wheel 185 generates electricity that is subsequently regulated by the voltage regulator 163 and returned to a battery bank selected from the plurality of battery banks 101 in a manner that recharges the selected battery bank.

The voltage regulator 163 is an electrical circuit. The voltage regulator 163 receives as input the electrical energy generated by the first generator 161 and the second generator 162. The voltage regulator 163 generates as output a regulated voltage used to provide the electrical energy required to recharge each individual battery bank 154 in the plurality of battery banks 101.

The fourth diode 164 is an electrical device that allows current to flow in only one direction. The fourth diode 164 installs between the first generator 161 and the voltage regulator 163 such that electricity will not flow from the voltage regulator 163 into the first generator 161.

The fifth diode 165 is an electrical device that allows current to flow in only one direction. The fifth diode 165 installs between the second generator 162 and the voltage regulator 163 such that electricity will not flow from the voltage regulator 163 into the second generator 162.

The control circuit 103 is an electrical circuit the controls the flow of electricity into and out of the plurality of battery banks 101. The control circuit 103 further comprises a logic module 171, the individual battery bank 154, the first battery bank sensor 115, the second battery bank sensor 125, the third battery bank sensor 135, the first discharge relay coil 117, the first charging relay coil 119, the second discharge relay coil 127, the second charging relay coil 129, the third discharge relay coil 137, and the third charging relay coil 139.

The logic module 171 is a commercially available electrical device such as a programmable logic controller. The logic module 171 receives input signals from the following sensors: a) the load sensor 183; b) the first battery bank sensor 115; c) the second battery bank sensor 125; and, d) the third battery bank sensor 135. Based on the measurements of the sensors, the logic module 171 controls the flow of electricity into and out of the plurality of battery banks 101 by controlling the following relay switches: a) the first discharge relay switch 116; b) the first charging relay switch 118; c) the second discharge relay switch 126; d) the second charging relay switch 128; e) the third discharge relay switch 136; and, f) the third charging relay coil 139.

The logic module 171 uses the first discharge relay coil 117 to control the first discharge relay switch 116. The logic module 171 uses the first charging relay coil 119 to control the first charging relay switch 118. The logic module 171 uses the second discharge relay coil 127 to control the second discharge relay switch 126. The logic module 171 uses the second charging relay coil 129 to control the second charging relay switch 128. The logic module 171 uses the third discharge relay coil 137 to control the third discharge relay switch 136. The logic module 171 uses the third charging relay coil 139 to control the third charging relay switch 138.

The following five paragraphs describe the operational parameters of the logic module 171.

The logic module 171 prevents the first discharge relay 113 and the first charging relay 114 from simultaneously being in a closed position. The logic module 171 prevents the second discharge relay 123 and the second charging relay 124 from simultaneously being in a closed position. The logic module 171 prevents the third discharge relay 133 and the third charging relay 134 from simultaneously being in a closed position.

The logic module 171 determines which battery 141 selected from the group consisting of the first battery bank 151, the second battery bank 152, and the third battery bank 153 will power the one or more electric drive motors 182. The logic module 171 determines the selected battery 141 by selecting the battery 141 that contains the greatest amount of stored potential energy.

The logic module 171 will close the first discharge relay switch 116 when: a) the load sensor 183 indicates that the one or more electric drive motors 182 of the electric vehicle 104 require more energy; while simultaneously, b) the first battery bank sensor 115 indicates that the stored chemical potential energy reserve in the first battery 111 is greater than 10% of the maximum storage capacity of the first battery 111.

The logic module 171 will close the second discharge relay switch 126 when: a) the load sensor 183 indicates that the one or more electric drive motors 182 of the electric vehicle 104 require more energy; while simultaneously, b) the second battery bank sensor 125 indicates that the stored chemical potential energy reserve in the second battery 121 is greater than 10% of the maximum storage capacity of the second battery 121.

The logic module 171 will close the third discharge relay switch 136 when: a) the load sensor 183 indicates that the one or more electric drive motors 182 of the electric vehicle 104 require more energy; while simultaneously, b) the third battery bank sensor 135 indicates that the stored chemical potential energy reserve in the third battery 131 is greater than 10% of the maximum storage capacity of the third battery 131.

The logic module 171 will close the first charging relay switch 118 when the first battery bank sensor 115 indicates that the first battery 111 has less than 10% of the maximum chemical potential energy. The logic module 171 will open the first discharge relay switch 116 when the first battery bank sensor 115 indicates that the first battery 111 has less than 10% of the maximum chemical potential energy. The logic module 171 will close the second charging relay switch 128 when the second battery bank sensor 125 indicates that the second battery 121 has less than 10% of the maximum chemical potential energy.

The logic module 171 will open the second discharge relay switch 126 when the second battery bank sensor 125 indicates that the second battery 121 has less than 10% of the maximum chemical potential energy. The logic module 171 will close the third charging relay switch 138 when the third battery bank sensor 135 indicates that the third battery 131 has less than 10% of the maximum chemical potential energy. The logic module 171 will open the third discharge relay switch 136 when the third battery bank sensor 135 indicates that the third battery 131 has less than 10% of the maximum chemical potential energy.

The logic module 171 will close the first charging relay switch 118 when the first battery bank sensor 115 indicates that the first battery 111 has less than 30% of the maximum chemical potential energy and the load sensor 183 indicates no need for additional power. The logic module 171 will close the second charging relay switch 128 when the second battery bank sensor 125 indicates that the second battery 121 has less than 30% of the maximum chemical potential energy and the load sensor 183 indicates no need for additional power. The logic module 171 will close the third charging relay switch 138 when the third battery bank sensor 135 indicates that the third battery 131 has less than 30% of the maximum chemical potential energy and the load sensor 183 indicates no need for additional power.

The following definitions were used in this disclosure:

Battery: As used in this disclosure, a battery is a chemical device consisting of one or more cells, in which chemical energy is converted into electricity and used as a source of power. Batteries are commonly defined with a positive terminal and a negative terminal.

Diode: As used in this disclosure, a diode is a two terminal semiconductor device that allows current flow in only one direction. The two terminals are called the anode and the cathode. Electric current is allowed to pass from the anode to the cathode.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that coaxially mounts in the stator. The magnetic interactions between the rotor and the stator physically cause the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Electric Vehicle: As used in this disclosure, an electric vehicle is a vehicle that uses an electric motor for propulsion. EV is a common abbreviation for electric vehicle.

Generator: In this disclosure, a generator is a machine that converts rotational mechanical energy into electric energy. A generator typically comprises a stator and a rotor. The stator is a stationary hollow cylindrical structure that forms a magnetic field. The rotor is a rotating cylindrical structure that coaxially mounts in the stator. The rotation of the rotor within the stator physically generates the electrical energy. A generator can generate an electrical voltage selected from the group consisting of an AC voltage and a DC voltage. When a DC voltage is generated, this disclosure assumes that the term generator includes commutator and electrical circuitry required to generate a DC voltage.

Logic Module: As used in this disclosure, a logic module is a readily and commercially available electrical device that accepts digital and analog inputs, and processes the digital and analog inputs to generate digital or analog outputs.

Maintained Switch: A used in this disclosure, a maintained switch is a switch that maintains the position that was set in the most recent switch actuation. A maintained switch works in an opposite manner to a momentary switch.

Motor: As used in this disclosure, a motor refers to the method of transferring energy from an external power source into rotational mechanical energy.

Normally Closed: As used in this disclosure, normally closed refers to an externally controlled electrical switching device, such as a relay or a momentary switch, which passes electric current when the externally controlled electrical switching device is in an unpowered state.

Normally Open: As used in this disclosure, normally open refers to an externally controlled electrical switching device, such as a relay or a momentary switch, which does not pass electric current when the externally controlled electrical switching device is in an unpowered state.

Regulated Voltage: As used in this disclosure, a regulated voltage refers to a source of DC voltage that incorporates circuitry that reduces changes in output voltages that occur in response to changes to the circuit's input power supply voltage or to changes in output, or load, current.

Relay: As used in this disclosure, a relay is an automatic electromagnetic or electromechanical device that reacts to changes in voltage or current by opening or closing a switch in an electric circuit. Relays further defined with a coil and a switch. Applying a voltage to the coil, usually referred to as energizing the coil, will cause the coil to change the position of the switch. Note: Though transistors can be configured to perform switching functions, transistors used for switching functions are handled separately in this disclosure and are explicitly excluded from this definition.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Unregulated Voltage: This refers to a source of DC voltage that changes in response to changes to the circuit's input power supply voltage or to changes in output, or load, current.

Vehicle: As used in this disclosure, a vehicle is a motorized device that is used for transporting passengers, goods, or equipment. The term motorized vehicle refers to a vehicle can move under power provided by an electric motor or an internal combustion engine.

Voltage Regulator: As used in this disclosure, a voltage regulator refers to an electrical circuit that takes unregulated voltage as its power input and provides a constant output voltage independent of variations to input power supply voltage or output, or load, current.

With respect to the above description, it is to be realized that the optimum dimensional relationship for the various components of the invention described above and in FIGS. 1 through 12 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A regenerative electric propulsion system comprising a plurality of battery banks, a regenerative circuit, and a control circuit;
   wherein the plurality of battery banks, the regenerative circuit, and the control circuit are electrically interconnected;
   wherein the regenerative electric propulsion system is configured for use with an electric vehicle;
   wherein the electric vehicle further comprises a plurality of wheels, one or more electric drive motors, and a load sensor;
   wherein the regenerative electric propulsion system provides electrical energy to the one or more electric drive motors such that the one or more electric drive motors propel the electric vehicle;
   wherein the load sensor is an electrical sensor that monitors the flow of electrical energy into the one or more electric drive motors;
   wherein the plurality of wheels further comprises a first selected wheel and a second selected wheel;
   wherein the control circuit monitors the load sensor;
   wherein each of the plurality of battery banks is a device that converts chemical potential energy into electrical energy used to power the one or more electric drive motors of the electric vehicle;
   wherein the regenerative circuit is a circuit that converts the motion of the electric vehicle into electricity used to recharge the plurality of battery banks;
   wherein the control circuit regulates and controls the operation of the regenerative electric propulsion system;
   wherein the plurality of battery banks comprises a collection of individual battery banks;

wherein each individual battery bank comprises a master battery, a master diode, a master discharge relay, a charging relay, and a master battery bank sensor;
wherein the master battery is a chemical device;
wherein the master battery converts energy stored as chemical potential energy into electrical energy;
wherein the master battery is a rechargeable battery;
wherein the master diode is an electrical device that limits the flow of electricity to one direction;
wherein the master diode prevents the unregulated backflow of electricity from a potential source into the master battery;
wherein the potential source is selected from the group consisting of the one or more electric drive motors and other battery banks selected from the plurality of battery banks;
wherein the master discharge relay is an electrical switching device;
wherein the master discharge relay forms a switch that controls the flow of electricity from the master battery into the one or more electric drive motors of the electric vehicle;
wherein the charging relay is an electrical switching device;
wherein the charging relay forms a switch that controls the flow of electricity from the regenerative circuit into the master battery;
wherein the master battery bank sensor measures the amount of chemical potential energy in the master battery that is available for conversion into electrical energy;
wherein the master discharge relay further comprises a master discharge relay switch and a master discharge relay coil;
wherein the master discharge relay switch is the physical switching element in the master discharge relay that completes the electrical circuit between the master battery and the one or more electric drive motors of the electric vehicle;
wherein the master discharge relay coil is the coil of the master discharge relay that controls the actuation of the master discharge relay switch;
wherein the master discharge relay coil is controlled by the control circuit;
wherein the charging relay further comprises a charging relay switch and a charging relay coil;
wherein the charging relay switch is the physical switching element in the charging relay that completes the electrical circuit between the regenerative circuit and the master battery;
wherein the charging relay coil is the coil of the charging relay that controls the actuation of the charging relay switch;
wherein the charging relay coil is controlled by the control circuit.

2. The regenerative electric propulsion system according to claim 1
wherein each of the plurality of battery banks is an electrical circuit that converts chemical potential energy into electrical energy;
wherein any first battery bank selected from the plurality of battery banks is configured to provide electrical energy to the one or more electric drive motors independently from a second battery bank selected from the plurality of battery banks;
wherein any first battery bank selected from the plurality of battery banks is configured to provide electrical energy to the one or more electric drive motors in conjunction with a second battery bank selected from the plurality of battery banks;
wherein the plurality of battery banks electrically connect in a parallel circuit.

3. The regenerative electric propulsion system according to claim 2 wherein the regenerative circuit is an electrical circuit that converts the momentum of the electric vehicle into electrical energy used to recharge the plurality of battery banks.

4. The regenerative electric propulsion system according to claim 3 wherein the control circuit is an electrical circuit the controls the flow of electricity into and out of the plurality of battery banks.

5. The regenerative electric propulsion system according to claim 4
wherein the plurality of battery banks further comprises a first battery bank, a second battery bank, and a third battery bank;
wherein the individual battery bank is selected from the group consisting of the first battery bank, the second battery bank, and the third battery bank;
wherein each individual battery bank contained within the plurality of battery banks is identical;
wherein the first battery bank is an electrical circuit that stores a portion of the electrical energy available to power the one or more electric drive motors of the electric vehicle;
wherein the second battery bank is an electrical circuit that stores a portion of the electrical energy available to power the one or more electric drive motors of the electric vehicle;
wherein the third battery bank is an electrical circuit that stores a portion of the electrical energy available to power the one or more electric drive motors of the electric vehicle.

6. The regenerative electric propulsion system according to claim 5
wherein the first battery bank comprises a first battery, a first diode, a first discharge relay, a first charging relay, and a first battery bank sensor;
wherein the first battery forms the master battery of the first battery bank;
wherein the first diode forms the master diode of the first battery bank;
wherein the first discharge relay forms the master discharge relay of the first battery bank;
wherein the first charging relay forms the master charging relay of the first battery bank;
wherein the first battery bank sensor forms the battery bank sensor of the first battery bank;
wherein the first discharge relay further comprises a first discharge relay switch and a first discharge relay coil;
wherein the first charging relay further comprises a first charging relay switch and a first charging relay coil;
wherein the first discharge relay switch forms the master discharge relay switch of the first discharge relay of the first battery bank;
wherein the first discharge relay coil forms the master discharge relay coil of the first discharge relay of the first battery bank;
wherein the first charging relay switch forms the master charging relay switch of the first charging relay of the first battery bank;
wherein the first charging relay coil forms the master charging relay coil of the first charging relay of the first battery bank.

7. The regenerative electric propulsion system according to claim 6
   wherein the second battery bank comprises a second battery, a second diode, a second discharge relay, a second charging relay, and a second battery bank sensor;
   wherein the second battery forms the master battery of the second battery bank;
   wherein the second diode forms the master diode of the second battery bank;
   wherein the second discharge relay forms the master discharge relay of the second battery bank;
   wherein the second charging relay forms the master charging relay of the second battery bank;
   wherein the second battery bank sensor forms the battery bank sensor of the second battery bank;
   wherein the second discharge relay further comprises a second discharge relay switch and a second discharge relay coil;
   wherein the second charging relay further comprises a second charging relay switch and a second charging relay coil;
   wherein the second discharge relay switch forms the master discharge relay switch of the second discharge relay of the second battery bank;
   wherein the second discharge relay coil forms the master discharge relay coil of the second discharge relay of the second battery bank;
   wherein the second charging relay switch forms the master charging relay switch of the second charging relay of the second battery bank;
   wherein the second charging relay coil forms the master charging relay coil of the second charging relay of the second battery bank.

8. The regenerative electric propulsion system according to claim 7
   wherein the third battery bank comprises a third battery, a third diode, a third discharge relay, a third charging relay, and a third battery bank sensor;
   wherein the third battery forms the master battery of the third battery bank;
   wherein the third diode forms the master diode of the third battery bank;
   wherein the third discharge relay forms the master discharge relay of the third battery bank;
   wherein the third charging relay forms the master charging relay of the third battery bank;
   wherein the third battery bank sensor forms the battery bank sensor of the third battery bank;
   wherein the third discharge relay further comprises a third discharge relay switch and a third discharge relay coil;
   wherein the third charging relay further comprises a third charging relay switch and a third charging relay coil;
   wherein the third discharge relay switch forms the master discharge relay switch of the third discharge relay of the third battery bank;
   wherein the third discharge relay coil forms the master discharge relay coil of the third discharge relay of the third battery bank;
   wherein the third charging relay switch forms the master charging relay switch of the third charging relay of the third battery bank;
   wherein the third charging relay coil forms the master charging relay coil of the third charging relay of the third battery bank.

9. The regenerative electric propulsion system according to claim 8
   wherein the first diode installs between the first battery and the first discharge relay switch of the first discharge relay such that electricity will not flow from a parallel battery into the first battery;
   wherein the parallel battery is selected from the group consisting of the second battery of the second battery bank and the third battery of the third battery bank.

10. The regenerative electric propulsion system according to claim 9
    wherein the second diode installs between the second battery and the second discharge relay switch of the second discharge relay such that electricity will not flow from a parallel battery into the second battery;
    wherein the parallel battery is selected from the group consisting of the first battery of the first battery bank and the third battery of the third battery bank.

11. The regenerative electric propulsion system according to claim 10
    wherein the third diode is an electrical device that allows current to flow in only one direction;
    wherein the third diode installs between the third battery and the third discharge relay switch of the third discharge relay such that electricity will not flow from a parallel battery into the third battery;
    wherein the parallel battery is selected from the group consisting of the first battery of the first battery bank and the second battery of the second battery bank.

12. The regenerative electric propulsion system according to claim 11
    wherein the regenerative circuit comprises a first generator, a second generator, a voltage regulator, a fourth diode, and a fifth diode;
    wherein the first generator, a second generator, the voltage regulator, the fourth diode, and the fifth diode are electrically interconnected.

13. The regenerative electric propulsion system according to claim 12
    wherein the first generator is an electrical generator;
    wherein the second generator is an electrical generator;
    wherein the first generator mounts on the electric vehicle such that the rotation of a first selected wheel selected from the plurality of wheels will rotate the first generator;
    wherein the second generator mounts on the electric vehicle such that the rotation of a second selected wheel selected from the plurality of wheels will rotate the second generator;
    wherein the rotation of the first generator by the first selected wheel generates electricity that is subsequently regulated by the voltage regulator and returned to a battery bank selected from the plurality of battery banks in a manner that recharges the selected battery bank;
    wherein the rotation of the second generator by the second selected wheel generates electricity that is subsequently regulated by the voltage regulator and returned to a battery bank selected from the plurality of battery banks in a manner that recharges the selected battery bank.

14. The regenerative electric propulsion system according to claim 13
    wherein the voltage regulator is an electrical circuit;
    wherein the voltage regulator receives as input the electrical energy generated by the first generator and the second generator;
    wherein the voltage regulator generates as output a regulated voltage;

wherein the fourth diode is an electrical device that allows current to flow in only one direction;

wherein the fifth diode is an electrical device that allows current to flow in only one direction.

15. The regenerative electric propulsion system according to claim 14 wherein the voltage regulator reverses the polarity of the first battery;

wherein the voltage regulator reverses the polarity of the second battery;

wherein the voltage regulator reverses the polarity of the third battery.

16. The regenerative electric propulsion system according to claim 15 wherein the fourth diode installs between the first generator and the voltage regulator such that electricity will not flow from the voltage regulator into the first generator;

wherein the fifth diode installs between the second generator and the voltage regulator such that electricity will not flow from the voltage regulator into the second generator.

17. The regenerative electric propulsion system according to claim 16 wherein the control circuit further comprises a logic module, the individual battery bank, the first battery bank sensor, the second battery bank sensor, the third battery bank sensor, the first discharge relay coil, the first charging relay coil, the second discharge relay coil, the second charging relay coil, the third discharge relay coil, and the third charging relay coil;

wherein the logic module, the individual battery bank, the first battery bank sensor, the second battery bank sensor, the third battery bank sensor, the first discharge relay coil, the first charging relay coil, the second discharge relay coil, the second charging relay coil, the third discharge relay coil, and the third charging relay coil are electrically interconnected;

wherein the logic module receives input signals from the following sensors: a) the load sensor; b) the first battery bank sensor; c) the second battery bank sensor; and, d) the third battery bank sensor;

wherein based on the measurements of the sensors, the logic module controls the flow of electricity into and out of the plurality of battery banks by controlling the following relay switches: a) the first discharge relay switch; b) the first charging relay switch; c) the second discharge relay switch; d) the second charging relay switch; e) the third discharge relay switch; and, f) the third charging relay coil.

18. The regenerative electric propulsion system according to claim 17 wherein the logic module is an electrical device;

wherein the logic module uses the first discharge relay coil to control the first discharge relay switch;

wherein the logic module uses the first charging relay coil to control the first charging relay switch;

wherein the logic module uses the second discharge relay coil to control the second discharge relay switch;

wherein the logic module uses the second charging relay coil to control the second charging relay switch;

wherein the logic module uses the third discharge relay coil to control the third discharge relay switch;

wherein the logic module uses the third charging relay coil to control the third charging relay switch;

wherein the logic module prevents the first discharge relay and the first charging relay from simultaneously being in a closed position;

wherein the logic module prevents the second discharge relay and the second charging relay from simultaneously being in a closed position;

wherein the logic module prevents the third discharge relay and the third charging relay from simultaneously being in a closed position;

wherein the logic module determines which battery selected from the group consisting of the first battery bank, the second battery bank, and the third battery bank will power the one or more electric drive motors;

wherein the logic module determines the selected battery by selecting the battery that contains the greatest amount of stored potential energy;

wherein the logic module will close the first discharge relay switch when: a) the load sensor indicates that the one or more electric drive motors of the electric vehicle require more energy; while simultaneously, b) the first battery bank sensor indicates that the stored chemical potential energy reserve in the first battery is greater than 10% of the maximum storage capacity of the first battery;

wherein the logic module will close the second discharge relay switch when: a) the load sensor indicates that the one or more electric drive motors of the electric vehicle require more energy; while simultaneously, b) the second battery bank sensor indicates that the stored chemical potential energy reserve in the second battery is greater than 10% of the maximum storage capacity of the second battery;

wherein the logic module will close the third discharge relay switch when: a) the load sensor indicates that the one or more electric drive motors of the electric vehicle require more energy; while simultaneously, b) the third battery bank sensor indicates that the stored chemical potential energy reserve in the third battery is greater than 10% of the maximum storage capacity of the third battery;

wherein the logic module will close the first charging relay switch when the first battery bank sensor indicates that the first battery has less than 10% of the maximum chemical potential energy;

wherein the logic module will open the first discharge relay switch when the first battery bank sensor indicates that the first battery has less than 10% of the maximum chemical potential energy;

wherein the logic module will close the second charging relay switch when the second battery bank sensor indicates that the second battery has less than 10% of the maximum chemical potential energy;

wherein the logic module will open the second discharge relay switch when the second battery bank sensor indicates that the second battery has less than 10% of the maximum chemical potential energy;

wherein the logic module will close the third charging relay switch when the third battery bank sensor indicates that the third battery has less than 10% of the maximum chemical potential energy;

wherein the logic module will open the third discharge relay switch when the third battery bank sensor indicates that the third battery has less than 10% of the maximum chemical potential energy;

wherein the logic module will close the first charging relay switch when the first battery bank sensor indicates that the first battery has less than 30% of the maximum chemical potential energy and the load sensor indicates no need for additional power;

wherein the logic module will close the second charging relay switch when the second battery bank sensor indicates that the second battery has less than 30% of the maximum chemical potential energy and the load sensor indicates no need for additional power;

wherein the logic module will close the third charging relay switch when the third battery bank sensor indicates that the third battery has less than 30% of the maximum chemical potential energy and the load sensor indicates no need for additional power.

* * * * *